No. 761,035. PATENTED MAY 24, 1904.
J. M. DODGE.
CHAIN.
APPLICATION FILED APR. 4, 1904.
NO MODEL.
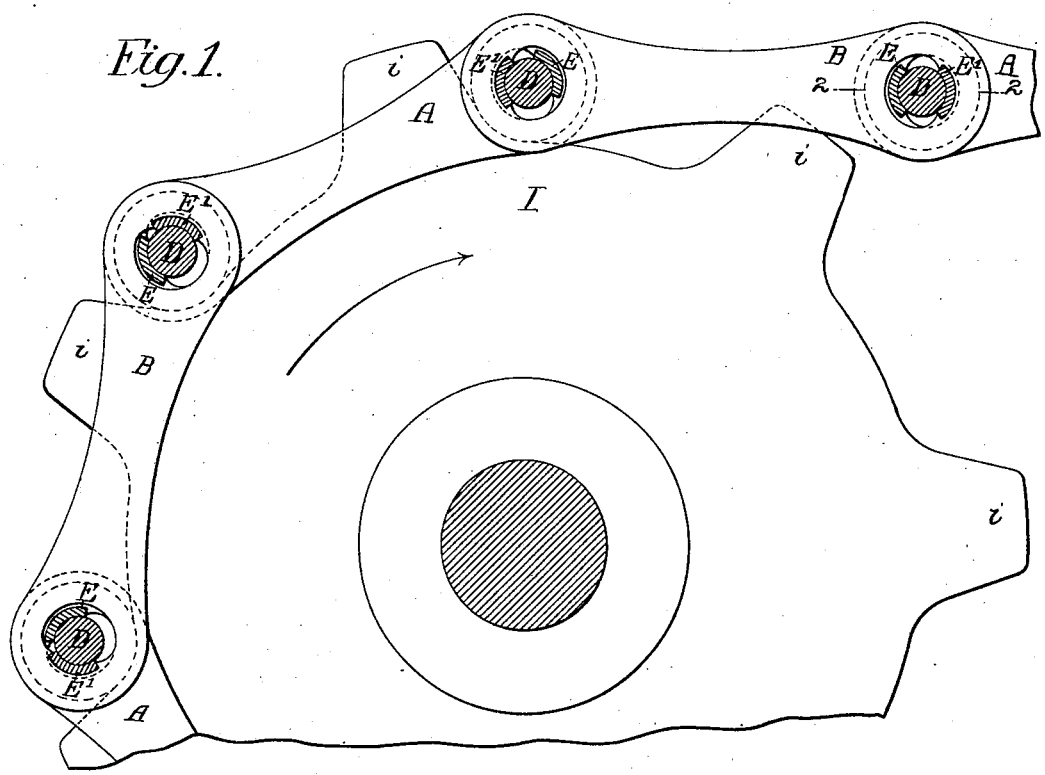
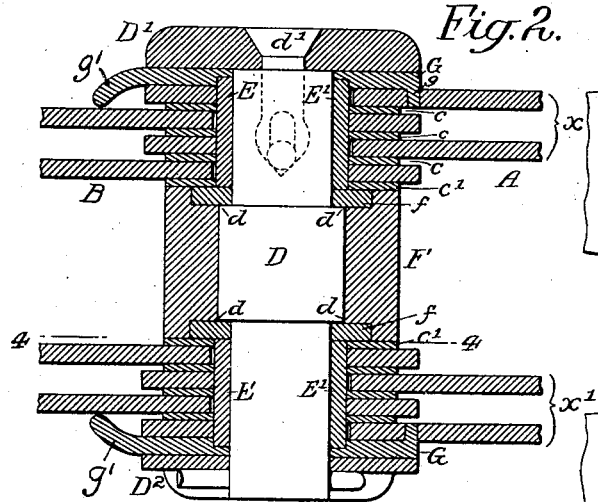
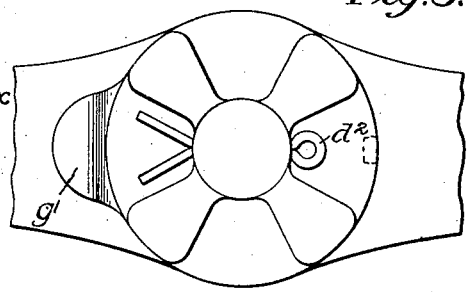
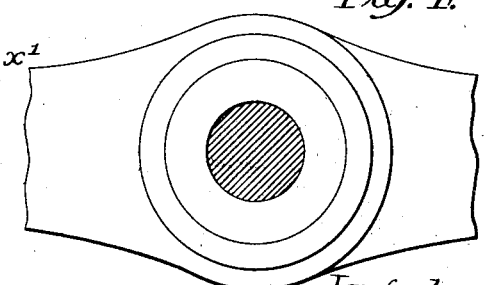
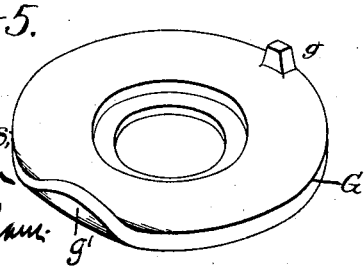
Witnesses:
H. D. Turner
Frank L. A. Graham
Inventor:-
James M. Dodge.
by his Attorneys;
Howson & Howson No. 761,035.

Patented May 24, 1904.

UNITED STATES PATENT OFFICE.

JAMES M. DODGE, OF PHILADELPHIA, PENNSYLVANIA.

CHAIN.

SPECIFICATION forming part of Letters Patent No. 761,035, dated May 24, 1904.

Application filed April 4, 1904. Serial No. 201,497. (No model.)

*To all whom it may concern:*

Be it known that I, JAMES M. DODGE, a citizen of the United States, residing in Philadelphia, Pennsylvania, have invented certain Improvements in Chains, of which the following is a specification.

My invention relates to certain improvements in drive-chains and embodies the feature set forth and claimed in the application for patent filed by me on the 1st day of April, 1904, Serial No. 201,123.

The object of the present invention is to so modify the construction of this type of chain as to allow it to be used in connection with a sprocket-wheel having its teeth in line and so that wheels can be mounted on the pivot-pins.

The invention further relates to certain other details in the construction of the chain, as fully described hereinafter.

In the accompanying drawings, Figure 1 is a view of my improved chain applied to a sprocket-wheel, the chain being in section at the pivots. Fig. 2 is a transverse sectional view on the line 2 2, Fig. 1. Fig. 3 is a side view of the chain shown in Fig. 2. Fig. 4 is a sectional view on the line 4 4, Fig. 2; and Fig. 5 is a perspective view of one of the lipped washers.

A and B are the links of a drive-chain. In this instance the link elements are narrow and arranged in two series $x\ x'$, the series being suitably spaced apart to allow the roller-wheel F to be located on the pivot-pin D between the elements. The pin extends the full width of the chain.

The pivot-pin is enlarged where the roller or wheel F bears upon it, forming shoulders $d\ d$, against which rest washers $f\ f$, set in recesses in each end of the wheel F. Mounted between these washers $f$ and lipped washers G in the present instance are segmental bushings E E', one set on each side of the wheel. The link elements A are notched to receive the bushings E, and the link elements B are notched to receive the bushings E', as clearly set forth in the application above mentioned, so that the wear will be taken by the bushings on the pivots in place of the narrow link elements directly bearing upon the pivots.

Mounted between the several link elements are washers $c$, and on each side of the wheel are washers $c'$ in the present instance. By this construction the links of each series have extended bearings upon the pivots, and the wheel is free to rotate on the pivot.

The washers G at each edge of the chain are attached to the outer link elements A by means of lugs $g$ on the washers which extend into recesses in the links. The opposite end of each washer has a lip $g'$, which is turned down, so as to rest close to the outer link element B. This construction gives a finish to the chain and limits the liability of the chain to catching.

In the present instance the links and washers are held in place by a cap D', secured to the pivot D by a double-headed rivet $d'$, while the links and washers on the opposite side are held by a washer $D^2$ of the form clearly shown in Fig. 3, which is secured to the pivot D by a cotter-pin $d^2$; but the means of attaching the caps to the pins may be modified.

The rivet $d'$ is fully illustrated and claimed in the patent granted to me on the 9th day of February, 1904, No. 751,902, and forms no part of my present invention.

A chain constructed as above described can be used in connection with a wheel I, Fig. 1, having teeth $i$ all in the same line, so that each tooth will find its bearing upon a wheel of the chain, and while I have shown a wheel carried by the pivot-pin it may be dispensed with in some instances.

I claim as my invention—

1. The combination in a chain, of two sets of links spaced apart, a pivot-pin common to both sets of links, and two sets of segmental bushings carried by the links and bearing upon the pivot-pin, substantially as described.

2. The combination of two sets of links, a pivot-pin common to both sets and reduced at each end to form shoulders, caps on the pivot-pin, and bushings mounted on each reduced portion of the pin, substantially as described.

3. The combination in a chain, of two sets of link elements spaced apart, a pivot-pin common to both elements, a wheel carried by the pivot-pin, said wheel being mounted between the two series of link elements, and segmental bushings mounted between the link elements and the pivot, substantially as described.

4. The combination in a chain, of two sets of link-sections, a pivot common to both sections, said pivot being reduced at each end forming shoulders, a wheel mounted on the center portion of the pivot, washers resting in recesses in each end of the wheel and against the shoulders of the pivot, outside washers, two sets of segments, one set of segments mounted between one wheel-washer and the outside washer, the other set of segments mounted between the other wheel-washer and the outside washer, caps secured to the pivot, one segment of each set secured to one series of link-sections and the other segments of each set secured to the other series of link-sections, substantially as described.

5. The combination in a chain, of two series of link elements, a pivot-pin common to both series, a set of segmental bushings mounted on each end of the pivot-pin, a wheel mounted on the central portion of the pivot-pin, and end washers secured to the outer links of each set and turned down toward the outer links of the other set, substantially as described.

6. The combination in a chain, of two sets of link-sections, a pivot-pin coupling the said sections together, two segmental bushings mounted on the pin, one bushing carried by one set of links and the other bushing carried by the other set of links, an outside washer having a lug resting in a recess of one of the links and having a lip turned down, substantially as described.

In testimony whereof I have signed my name to this specification in the presence of two subscribing witnesses.

JAMES M. DODGE.

Witnesses:
   WILL. A. BARR,
   JOS. H. KLEIN.